Figure 1:
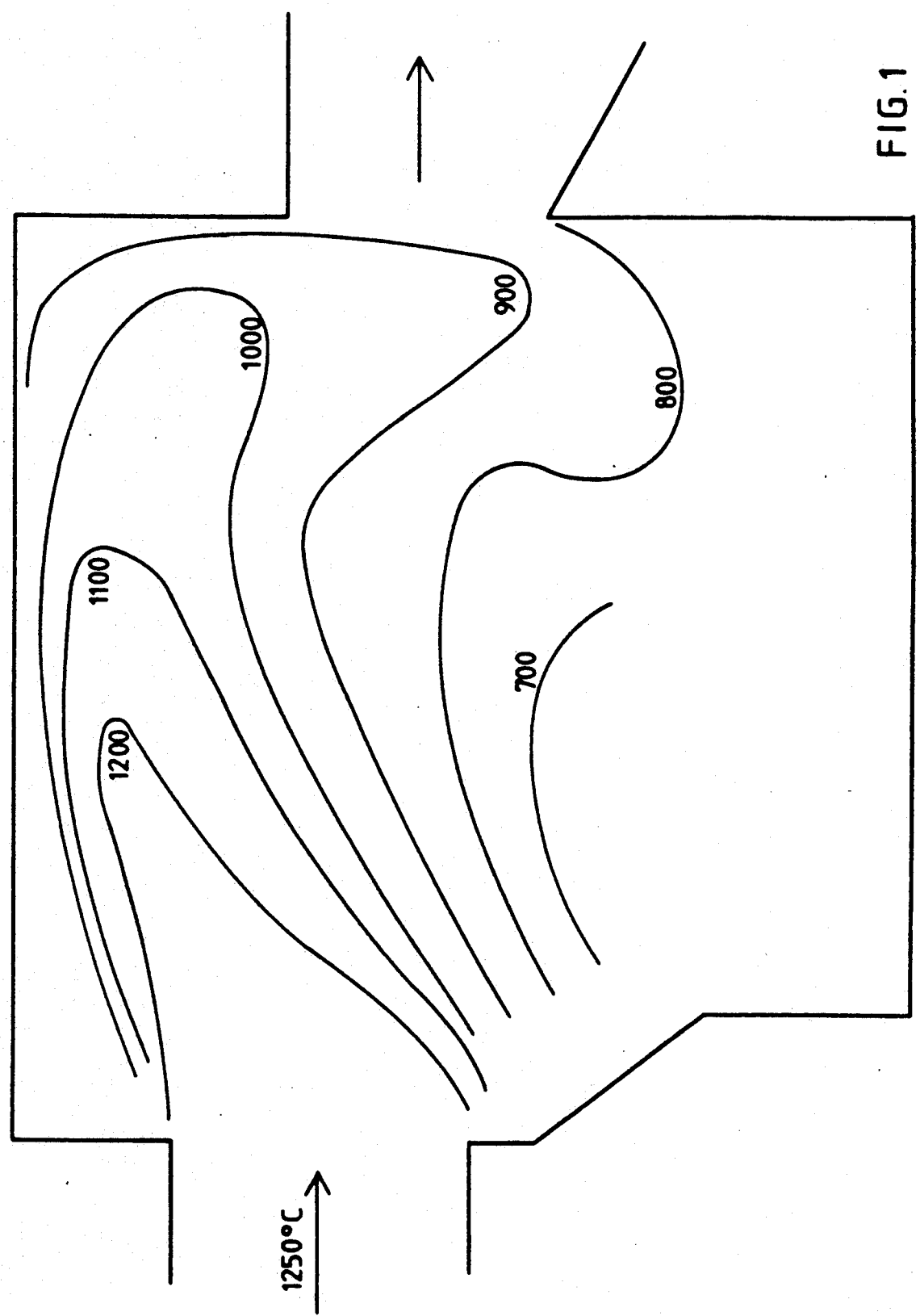

United States Patent [19]

Malmström et al.

[11] Patent Number: 5,029,556
[45] Date of Patent: Jul. 9, 1991

[54] METHOD OF RECOVERING HEAT FROM HOT PROCESS GASES

[75] Inventors: Rolf E. Malmström, Helsinki; Pekka O. Ritakallio, Hämeenlinna, both of Finland

[73] Assignee: A. Ahlstrom Corporation, Noormarkku, Finland

[21] Appl. No.: 314,847

[22] Filed: Feb. 24, 1989

[30] Foreign Application Priority Data

Feb. 29, 1988 [FI] Finland ................................. 880921

[51] Int. Cl.⁵ .............................................. F22D 1/00
[52] U.S. Cl. .................................... 122/7 R; 110/234; 110/233
[58] Field of Search ................. 110/233, 234; 122/7 R

[56] References Cited

U.S. PATENT DOCUMENTS 4,091,748  5/1978  Mansfield ........................... 110/234
4,242,972  1/1981  Sicard ................................. 110/234

Primary Examiner—Henry C. Yuen
Attorney, Agent, or Firm—Nixon & Vanderhye

[57] ABSTRACT

The invention relates to a method of improving the heat recovery in a waste head boiler, in which gas, produced in high-temperature processes and containing molten and/or solid particles and/or evaporated components, is cooled. In a waste heat boiler, a slowly cooling zone, i.e. a hot "tongue" is generally formed in the gas flow. To improve the cooling of the hot "tongue", gas and/or solid particles and/or vaporizing liquid, such as circulating gas or circulating particles separated from the process and cooled, are introduced into the hot zone or "tongue".

8 Claims, 6 Drawing Sheets

METHOD OF RECOVERING HEAT FROM HOT PROCESS GASES

The present invention relates to a method of improving the heat recovery process in a waste heat boiler, where a hot process gas flow, produced in high-temperature processes and containing evaporated components and/or molten and/or solid particles, is cooled in the radiation section of the boiler.

High-temperature gases are produced in various high-temperature processes such as, for example, melting of metal concentrates and metals, reduction of metal oxides, reduction and fuming processes of metallurgical slags and high-temperature processes in the chemical industry. Heat recovery from such gases and cooling of gas are essentially impeded by components contained therein, which tend to stick to the heat surfaces. Sticky compounds may also be produced as a result of cooling.

Such compounds that foul heat transfer surfaces are, for example:

melt drops that solidify when being cooled, compounds evaporating in process conditions and condensating or sublimating when being cooled, dust particles that tend to sinter, fume or aerosol, the particle size of which is especially small, generally less than 1 micron, and which easily sticks to other fume particles and surfaces met, molten or solid compounds produced by chemical or other reactions and during cooling.

Depending on the case, the same process gas may contain one or more of the above-mentioned components. These components have a common feature of sticking to the heat transfer surfaces of a heat exchanger or a boiler when the gas flows through the heat exchanger. As a result, the heat exchanger gradually becomes clogged thereby losing its effect, which usually leads to running down of the process. Therefore, the process gases and especially the dust particles contained therein have to be cooled to a temperature at which the dust is solid before leading the gases to the convection part.

For example, suspension smelting of sulphide concentrates, such as the flash smelting process developed by Outokumpu Oy, produces gases containing dust particles, the temperature of such gases being normally 1200 to 1400° C. Heat recovery from these gases is usually effected by a two-compartment waste heat boiler developed by A. AHLSTROM CORPORATION, such boiler comprising a radiation section and a convection section. Dust particles produced by flash smelting cause severe fouling problems both in the uptake shaft of the furnace and in the boiler itself. Both mechanical means and separate oil burners have been employed to get rid of dust accumulations. Problematic in the flash smelting process is especially the gas outlet in the uptake shaft, i.e. the inlet of the waste heat boiler becoming heavily fouled and having a tendency of becoming clogged. In practice, this results in a significant increase in the gas speed at the outlet in comparison with what it is if the outlet is clean and has its original dimensions.

When being exhausted from the uptake shaft through the inlet into the radiation chamber of the waste heat boiler, high-temperature viscose gas containing dust particles forms a hot "tongue", which extends far in the radiation chamber and wherein gases cool more slowly than the surrounding gas. The existence of the "tongue" has been established by, for example, temperature measurings carried out in the radiation chamber.

FIG. 1 illustrates the temperature curves in a waste heat boiler into which process gas is introduced at the temperature of 1250° C. A hot "tongue" of 1200° C. extends far in the boiler. Still in the latter part of the radiation section of the waste heat boiler, before the convection section, there is a relatively hot area of 900° C. If the inlet to the waste heat boiler is partly clogged, the gas enters the boiler at a higher speed than calculated and the formation of the "tongue" is increased further.

The task of the radiation section is to cool the gases and dust released from the process to a sufficiently low temperature before they are introduced into the convection section. In this way, the clogging of the convection section is avoided. In the radiation chamber, especially in large units, cooling of gas begins in the outer parts, proceeding towards the center, whereby a temperature gradient naturally tends to form towards the center, i.e. a zone of slowly cooling gases or of a hot temperature is formed in the center. Contrary to this, a zone of quickly cooling gases is formed in the vicinity of the walls of the radiation chamber. This phenomenon is further intensified by the flow-technical phenomenon mentioned earlier, which contributes to the formation of the hot "tongue". Heat recovery from the hot "tongue" in the radiation section is relatively inefficient.

The lately process development has changed the situation still more unfavourable. Introduction of oxygen enriched air and/or technical oxygen in metallurgical processes has caused a significant increase in the share of sulphur compounds in the process gases, which has resulted in a considerable increase in the proportional share of reactions associated with, for example, sulphating of dust particles. This also influences the increase in the significance of the hot "tongue" because sulphating is mainly effected not until cooling induces it, whereby it takes place last in the heart of the gas flow, i.e. in the hot "tongue" at the same time releasing heat thereto, thus maintaining a temperature higher than average in the internal parts of said gas flow.

Besides the flow of process gas, heat recovery process, and chemical reactions mentioned above, also the shape of the waste heat boiler itself may contribute to an uneven flow of hot gas and cooling in the boiler.

In practice, the above-mentioned phenomena require quite a large and long radiation section so that all dusts cool sufficiently before entering the convection section, and the problems with clogging are avoided. An overheated "tongue" is naturally unfavourable also for the structure of the boiler itself, especially if it touches the walls. As shown in FIG. 1, for example, a relatively hot "tongue" of 900° C. extends as far as the end part of the radiation section, i.e. the beginning of the convection section, although the gas present in other parts of the radiation chamber has cooled. However, a sufficiently large radiation section is generally an expensive investment. The large size of the radiation chamber causes layout problems and its operating costs are high with regard to pumps, cleaning equipment, dust transporting means etc.

Corresponding problems exist also in coal gasifying processes. With the increase in the energy price and with stricter regulations on emissions, various coal gasifying processes have become current. A large number of different gasifying processes exists. Common to most of them is that, gasifying is effected at a high temperature of 700 to 1500° C. and that the gases are contaminated. Gases of gasifying processes contain drops, dusts, fumes etc. which cause fouling problems with heat surfaces.

Cooling of the product gas of the gasifying processes is, for the reasons described above, generally problematic, especially when considering that the process is usually overpressurized and that gases containing $CO/H_2$ are poor radiators because of their low $CO_2$ and $H_2O$ contents.

The analysis of the Molten Iron Pure Gas process, for example, is approximately as follows

| | |
|---|---|
| CO | 65-70 vol % |
| $H_2$ | 25-30 vol % |
| $CO_2$ | 0.3 vol % |

The radiation propreties of such gas are so poor that the cooling of them in the radiation section is most inefficient requiring quite a large and expensive radiation section. The dust, approximately 50 g/Nm³, contained in the gases contributes to radiation to some extent. The amount of process dust is, however, so small that radiation heat transfer is quite minimal. On the other hand, the amount of dust is so high that, when entering the convection section at too high a temperature, the dust soon clogs the convection section thus deteriorating its function and resulting in that the process has to be run down. In pressurized gasification, the investments related to cooling of the product gas are, for the above-mentioned reasons, really great with regard to the waste heat boiler. This lowers the competitiveness of gasifying processes.

The phenomena described above cause in practice fouling problems with the boiler and, consequently, poor usability of the process. Several suggestions and methods exist for resolving the above-mentioned problems.

Sweeping technique often improves the situation. However, it involves considerable costs in the form of sweepers and their operating systems. In many cases, the use of blow sweepers is restricted also by the harmful effect of sweeping gas on the process gas analysis. Problems caused by blow sweepers can be partly avoided by using mechanical sweepers such as shakers, blow hammers and spring hammers. The use of these, however, results in a great number of constructional restrictions which usually call for very costly arrangements.

It has been attempted in many ways to apply the principle of autogenous sweeping by leading the process gases to a fluidized bed provided with heat surfaces. Drawbacks of such methods are pressure losses, even 300 to 1000 mmwc, problems with grates, and wearing of the heat surfaces. For this reason, the systems based on the fluidized bed are in limited use.

Finnish patent 64997 discloses a circulating fluidized bed reactor provided with cooling surfaces, in which reactor the temperature of gas containing melt drops is lowered before the heat exchanger below the range of the eutectic temperature of melt drops by mixing the gas with circulated solid particles which have cooled in the heat exchanger and have been separated from the gas. In this method, the solid particles are returned from the cyclone, which serves as a particle separator, simply by means of direct return and are immediately mixed with the process gas in the space above the suction opening. The operation of this method requires a certain minimum flow of gas in order that the dust, on one hand, would not flow back to the process through the suction opening and that the dust, on the other hand, would flow along with the gas through the cooler. In some cases this restricts the operability of the method because a great volume of inlet gas tends, also in the fluidized bed reactor, to form a hot "tongue" extending from the inlet far into the reactor. If the hot "tongue" extends as far as the heat-exchanger, it may cause clogging of heat transfer surfaces.

Finnish patent 65632 discloses a method of recovering heat from dust-containing gases produced in suspension smelting of sulphide concentrates. In accordance with the method, dust-containing gases produced in suspension smelting are mixed with a cooler, reacting medium mainly before said gases are brought into indirect heat exchanging contact. In this method, cooler solids are added to the rear end of the furnace before the gases enter the boiler. The purpose of this procedure is, on one hand, to lower the gas temperature and thereby to lessen the stickiness of the dusts and, on the other hand, to affect the dust analysis in such a manner that the tendency of dust to sinter will decrease. Lowering of the inlet temperature, however, weakens the efficiency of radiation heat transfer. Prerequisite for a success would be, for example, that some feed material of the process would serve as the reacting solid and that the necessary addition of this material would be within the limits necessary for the success. This is a considerable restriction.

A great problem in practice is how to arrange the infeed in such a manner that the addition of solids really works as designed, the solids not sticking to the furnace walls, on which melt is flowing, and causing gradual clogging of either the furnace or the gas exhaust opening. Constructing ducts through the thick walls of the furnace itself is also a very exacting task.

One of the used methods of cooling the process is to mix cooler gas with the process gas immediately in the beginning of the boiler, in the radiation chamber. In practice, this is usually implemented so that, after gas cleaning, part of the process gas is returned to the beginning of the boiler. Known methods, however, require such high amounts of circulating gas, i.e. 2 to 4 times the amount of the process gas that, correspondingly, the convection section and the gas cleaning system of the boiler have to be capable of handling very high amounts of gas. This results in considerable invenstment and operating costs.

English patent 1379168 discloses a method the object of which is to prevent melt from sticking to the boiler walls. In accordance with the method, gas such as, for example, nitrogen or circulated and cleaned process gas which reduces the oxygen content of the process gases, is introduced into the boiler. This prevents a secondary combustion reaction in a waste heat boiler. The method does not prevent the hot "tongue" from being produced in the gas flow, or the drawbacks caused thereby.

The object of the present invention is to provide a more efficient and less costly method of cooling process gases which foul heat transfer surfaces and of heat recovery.

The invention will be described more in detail in the following. The method of the invention is characterized in that, in the radiation section of the waste heat boiler, the process gas flow and more particularly its slowly cooling zone, i.e. a hot "tongue" is supplied with gas and/or solid particles and/or vaporizing liquid which contribute to the cooling of said hot "tongue".

In the radiation section, gas and/or particles and/or liquid are added to the internal parts of the process gas flow in such a manner that they quickly suspend among the hot process gas to be treated. Thus, cooling of gas is speeded up especially in the zone of slowly cooling gases and/or the emissivity of the gas is raised, thereby intensifying the radiation heat transfer from the hot "tongue" and contributing to the cooling of the process gas.

Addition of gas, solid particles or liquid may be effected in many ways. A practical way is to make the addition pneumatically by blowing with a lance or lances, whereby the addition is possible to be directed to a set area of the hot "tongue" by adjusting the set of the lances.

In some cases, it may be advantageous to blow the solids flow axially direct to the heart of the gas flow, which efficiently contributes to the elimination of the hot "tongue". In some cases, the lance may be disposed, for example, through the uptake shaft of the furnace in such a manner that the discharge opening of the lance is in the vicinity of the boiler inlet, whereby blowing is well directed to the heart of the gas flow.

Another practical means is to install blow nozzles on the walls of the boiler radiation chamber, whereby the addition is possible to be directed to a correct spot and in a correct quantity by adjusting the direction of the nozzles and the impulse of the jet. In special cases, the addition may be effected successfully direct by a spout from above the boiler without using specific blow gas.

For example, cleaned process gas circulated from the end part of the process can be used as the gas supplied to the "tongue" or as a carrier gas transporting solids, whereby it does not affect the analysis of the process gas. The carrier gas may also be inert gas or chemically active gas, if it is necessary to induce, for example, some chemical reaction. A good example is air, which is added, for example, to bring about afterburning or to bring about or intensify sulphating.

The dust supplied to the hot "tongue" may be, for example, process dust separated in an electric filter, whereby the dust analysis is not affected either. In special cases, also some other dust, either inert or chemically active dust, may be considered if it is necessary, for example, to make some gas cleaning measure or to bring about a desired reaction.

An essential task of the addition of dust, gas or liquid is to efficiently cool the hot "tongue" produced in the radiation chamber or to totally eliminate the formation of the hot "tongue". By leading gas and/or solid particles into the gas flow, for example, by means of lances or sufficiently powerful jets or in some other suitable manner, it is possible to locally cool the hot zone forming in the internal parts of the gas flow, whereby the formation of the hot "tongue" and harmful effects caused by said "tongue" are avoided.

Addition of dust has also another important task, namely to essentially improve the emissivity of the process gas locally in the hot "tongue", which also improves the heat transfer and heat recovery. The emissivity of gas is among other things dependent on the amount of particles per unit volume. By increasing the number of particles locally in the hot "tongue" to a required level, the radiation heat transfer is essentially improved.

Case by case, either one or both of the means for reducing the drawbacks related to cooling of contaminated gases, namely the elimination of problem caused by the hot "tongue" and intensification of the heat transfer by raising the emissivity, are important at the same time.

For example, in connection with the flash smelting process, the elimination of the hot "tongue" and thus cooling of molten particles is important. If it is desired to provide also as efficient a possible sulphating of dust in the radiation chamber, this can be intensified by using, for example, air as the carrier gas, necessary oxygen being received therewith exactly where it is needed in the system. Because of the originally high dust content of the process gas, the effect of the dust addition on the emissivity is generally not very important in connection with the flash smelting process. By eliminating the hot "tongue", the operation of the radiation chamber is essentially intensified and the dimensions of the radiation chamber can be much reduced or the capacity of the existing radiation chamber be raised.

On the other hand, addition of dust in connection with coal gasification provides an essential improvement in the emissivity, thereby much intensifying the radiation heat transfer in the radiation section of the boiler. This results in a much more efficient and more compact radiation section.

Addition of dust also gives a great advantage with regard to gas cleaning. Added dust particles function as heterogeneous nucleus creators, evaporated compounds contained in the gas condensating on, melt drops sticking to and fumes adsorbing onto the surface thereof.

It is essential to notice that the addition of cool solid particles is not intended to provide cooling of the whole process gas flow because then, caused by lowering of the temperature, the radiation heat transfer from the whole amount of gas will quickly deteriorate. The efficiency of the radiation heat transfer is usually significant not until the temperature exceeds 900° C. and highly significant at temperatures exceeding 1200° C. Instead, the addition of solid particles in accordance to the invention is mainly intended for eliminating of the hot "tongue" and the drawbacks originating therefrom. Similarly, the addition of solid particles is in special cases intended to improve the radiation heat transfer by favourably affecting the emissivity of the gas flow.

By feeding solid particles in a controlled manner into the gas to be treated and particularly into a right spot thereof, an efficient cooling is locally brought about without any significant increase in the gas volume in general or even locally. Local growth of the gas volume would cause heavy disturbances in the flow of gas in the boiler and also during an increase of the volumetric flow. In some processes, the addition of gas may have a negative effect also on the composition of the produced gas.

In some applications, however, an increased amount of gas and turbulences possibly generated in the boiler are not negative, and addition of mere gas without dust particles is possible even if it were necessary to use great amounts thereof in comparison with the treated gas in order to bring about the desired effect.

A significant advantage of blowing of dust particles is the adjustability of the system. By varying the flow speed at the outlet of the lance or a nozzle and the ratio of mass flows of dust/gas, it is possible to adjust the jet impulse and the penetration within a very large range.

The solids may be directed to an exactly correct place even from long distances when necessary. The lance itself need not necessarily extend to the "tongue". Thus, the exhaust opening of the lance may be even on the level of the boiler wall, although the jet penetrates the center area of the gas flow to be treated. The lance may naturally be cooled, for example, by water, whereby it endures the prevailing conditions and can be so disposed that the dust/gas suspension is discharged from the lance directly to the heart of the gas flow in an expedient manner.

In a special case, only vaporizing liquid, such as water, may be easily injected to the heart of the gas flow, whereby a great deal of heat is bound already by a very small amounts of liquid and a desired quick cooling of the hot "tongue" is brought about very simply.

Figure 2:
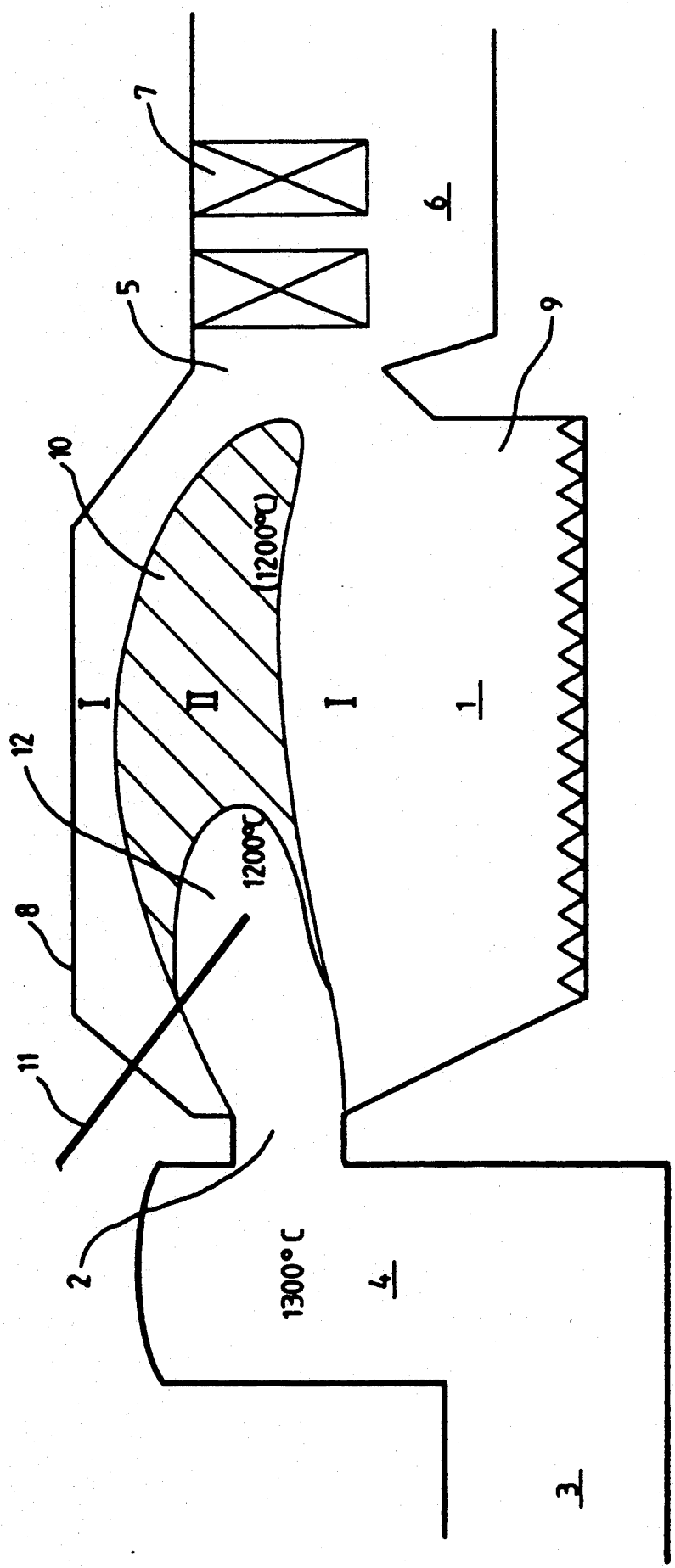
Figure 3:
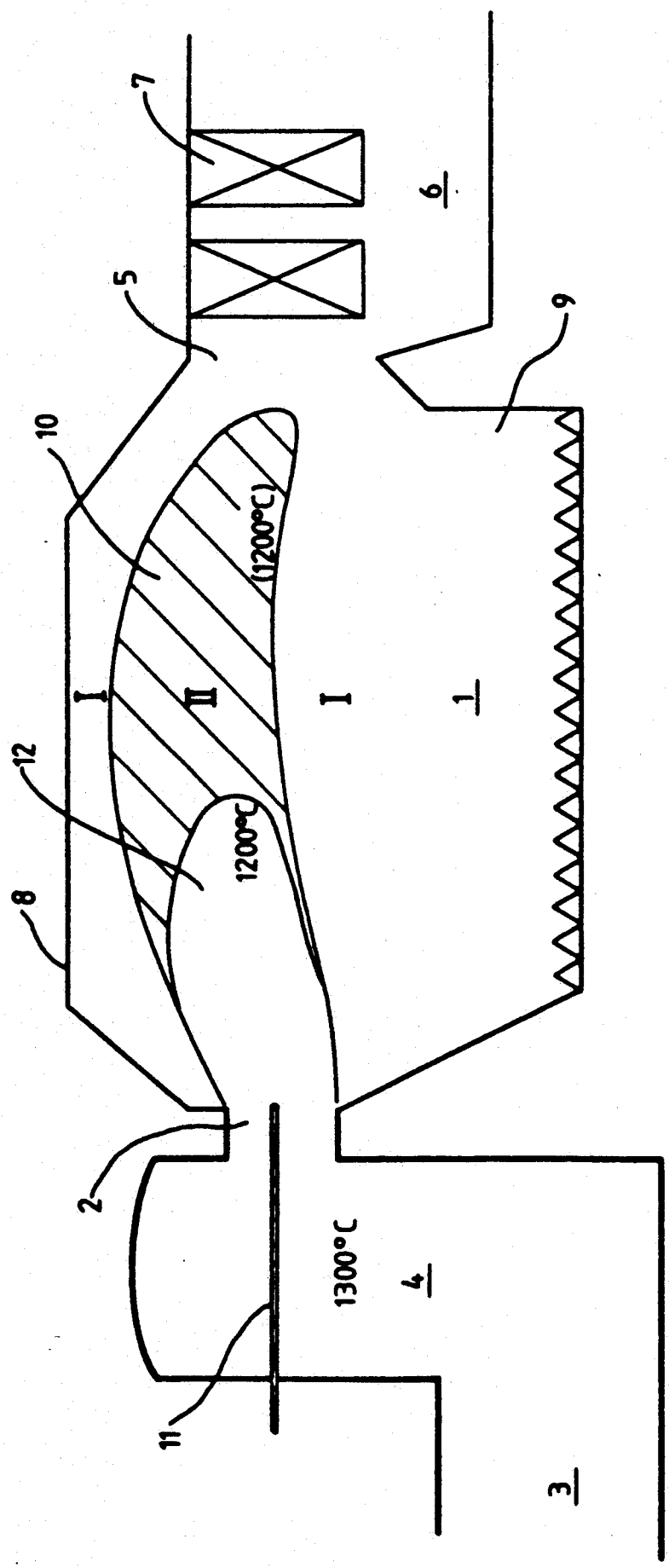
Figure 4:
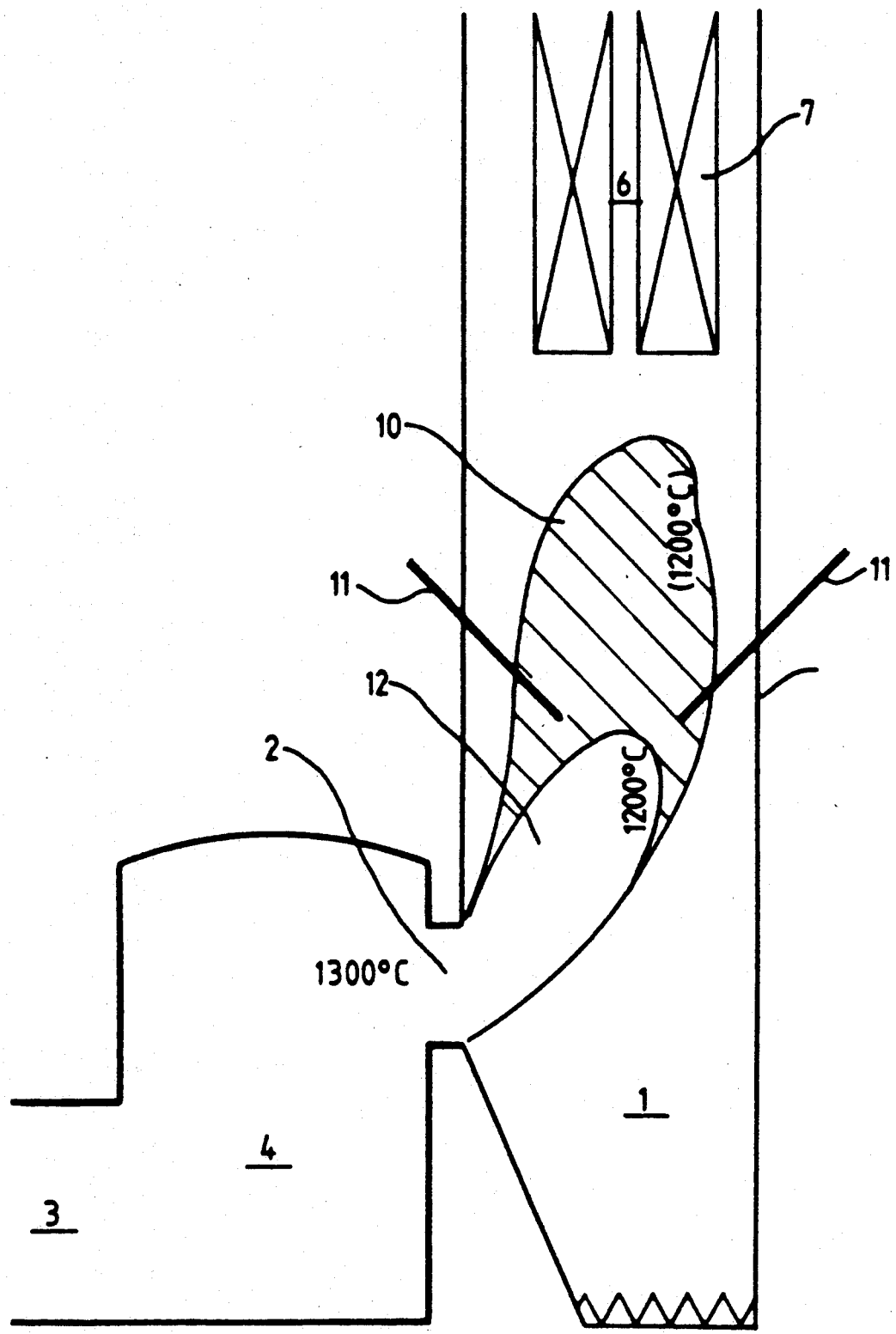
Figure 5:
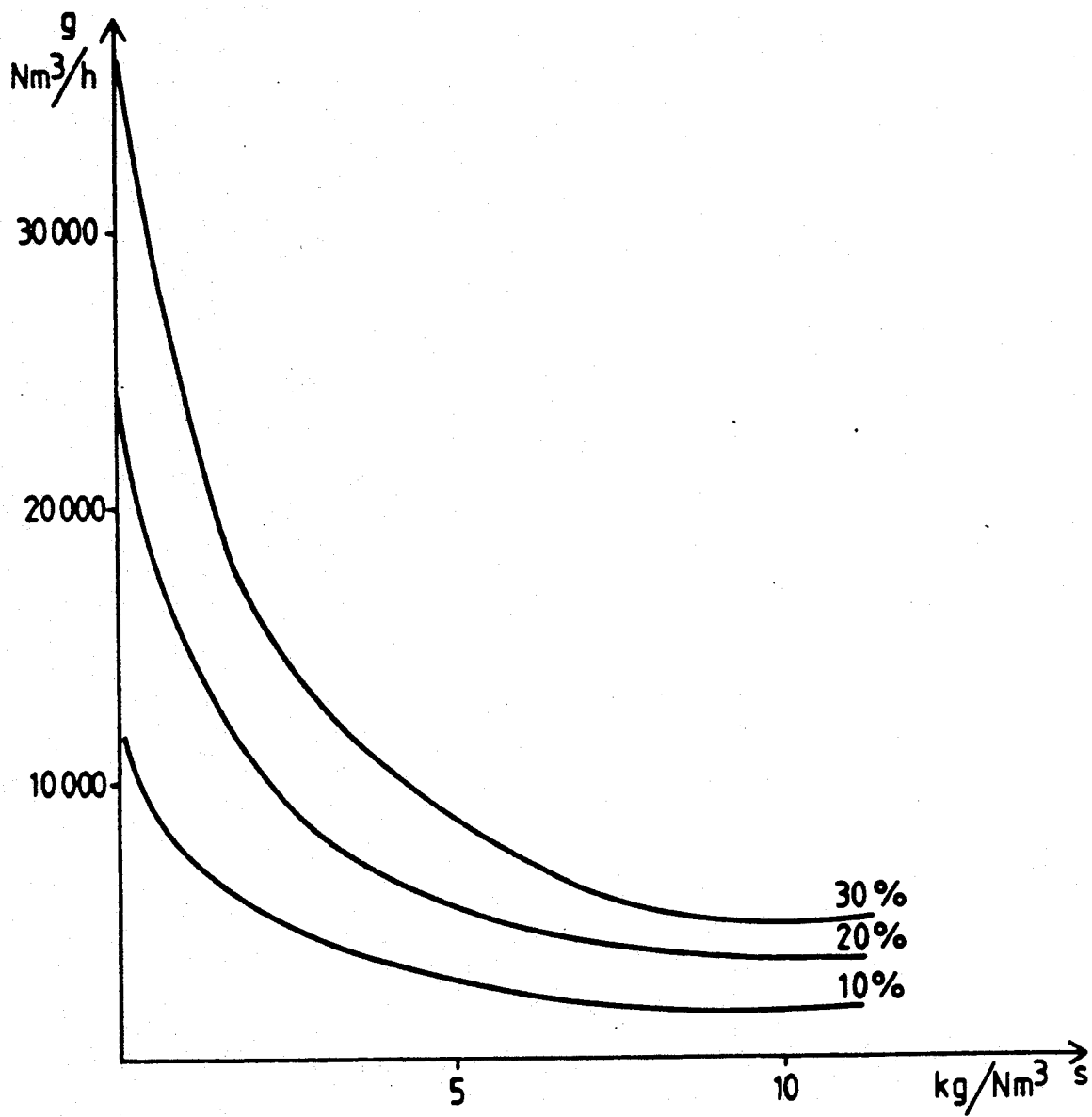
Figure 6:
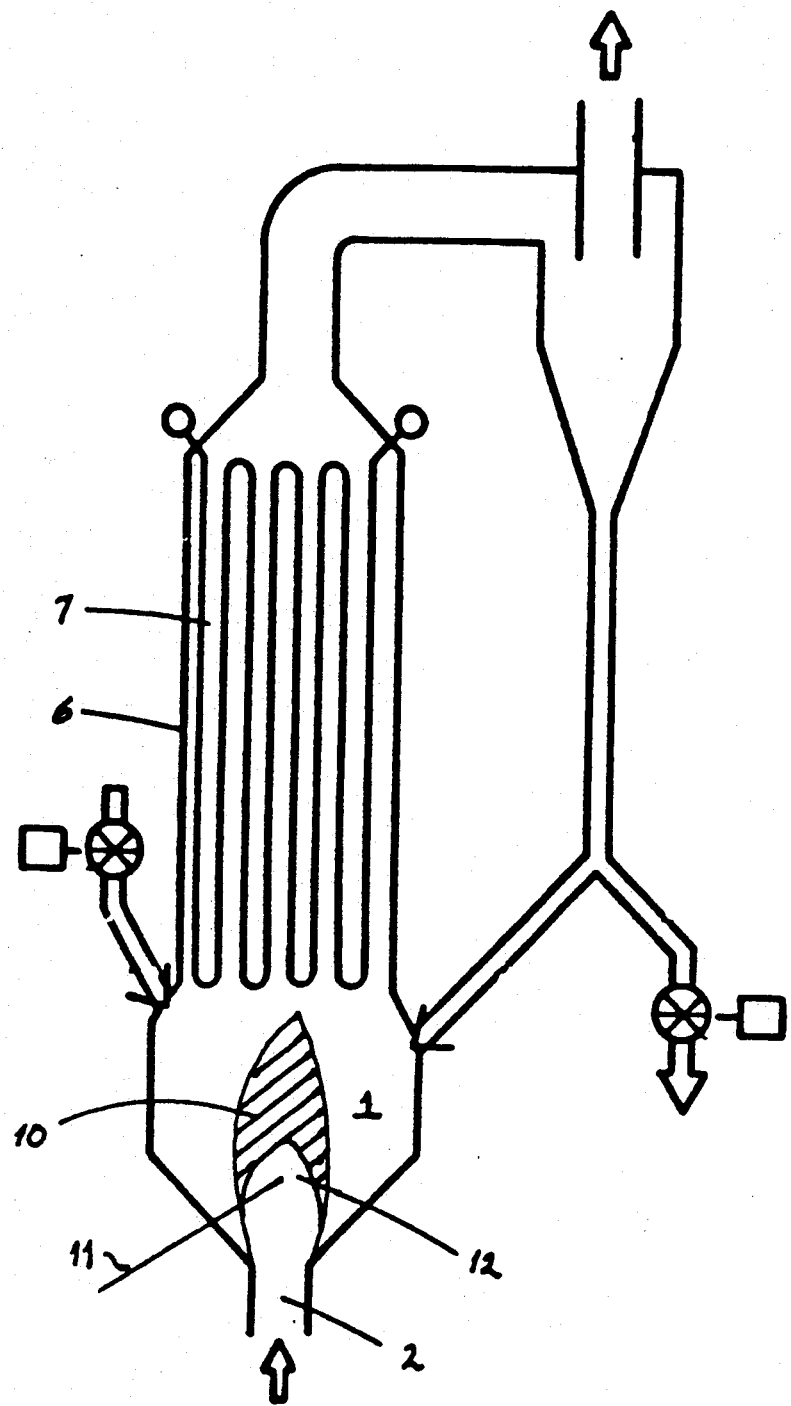

The invention will be further described by way of example, with reference to the enclosed drawings, in which FIG. 1 to which reference was made earlier, illustrates temperature gradients in a waste heat boiler, which is not using the method of the invention, FIG. 2 is a schematic illustration of an embodiment according to the invention, FIG. 3 is another embodiment of the invention, FIG. 4 is a third embodiment of the invention, FIG. 5 illustrates graphs showing the need for addition of solid particles and gas when cooling the process gas, and FIG. 6 illustrates an application of the invention to a circulating fluidized bed reactor.

FIG. 2 illustrates the radiation section 1 of the waste heat boiler, provided with an inlet 2 for hot 1300° C. process gases, for example, from the uptake shaft 4 of the furnace 3 and an outlet for gases to the convection section 6 of the boiler, said convection section being provided with heat transfer surfaces 7. Before applying the method of the invention to the boiler, the process gas was quickly cooled, when flowing to the radiation section, in the zones I near the walls and the bottom section of the boiler. On the other hand, a lengthy zone II, i.e. a hot "tongue" which cooled poorly and in which the temperature remained even as high as 1200° C. was formed in the heart of the gas flow. Such hot "tongue" extends even as far as the outlet 5 of the radiation section. Thus, harmful sticky dusts flow along with the gas to the convection section 6 of the waste heat boiler, impeding the heat transfer to the heat transfer surfaces 7.

When the method according to the invention is applied, the boiler is provided with a lance 11 through the wall 8 of the boiler. Solid particles are led to the hot "tongue" 10 by means of this lance and the particles contained in said "tongue" are cooled. Thus, the hot "tongue" 12 becomes considerably smaller.

In another embodiment as shown in FIG. 3, the lance 11 is disposed approximately in the middle of the inlet 2 of the boiler. In this case, cooling of the hot "tongue" is brought about right from the inlet.

In the embodiment as shown in FIG. 4, the method according to the invention is applied to a vertical waste heat boiler. Elimination or reduction of the hot "tongue" 10 in such a manner that it will not be harmful is effected by disposing two lances on the opposite walls 8 of the radiation section.

The following example shows the need of circulating dust and circulating gas when part of the hot gas flow of 1250° C., 100,000 Nm³/h is cooled. Of the gas flow is cooled either the hot heart or the hot "tongue" touching, for example, the ceiling. The gas is cooled to a temperature of 750° C. Cooling is effected by means of circulating gas and circulating dust of 350° C. FIG. 5 shows the need for circulating gas and circulating particles when either 10, 20 or 30% of the total gas amount is cooled. The amounts of circulating gas (Nm³/h) are shown on the vertical axis and those of circulating particles (kg/Nm³/h) are shown on the horizontal axis.

When cooling 20% of the gas flow by mere circulating gas, the necessary amount of circulating gas is about 24000 Nm³/h. When both circulating gas and circulating particles, 9 kg/Nm³, are added by the method of the invention, only 4500 Nm³/h of circulating gas is needed. By adding solid particles to the circulating gas, a better mixing is achieved because, at the same speed, the gas/particle suspension has seven times the impulse and kinetic energy in comparison with mere gas.

It can also be judged from the graphs of FIG. 5 that, when cooling still higher amounts of process gas, the necessary amount of circulating gas would also grow considerably, especially, if the amount of circulating particles were kept low.

The invention is not limited to the embodiment of the above example, but several variations and applications within the inventive scope of the claims are possible. Thus, the invention is also applicable to a circulating fluidized bed reactor serving as a waste heat boiler, as shown in FIG. 6, in which reactor the hot gases are first cooled in the radiation section by means of circulating particles and thereafter by means of heat transfer surfaces in the convection section. Gas and/or solid particles and/or liquid contributing to cooling are introduced into the "tongue" of hot gas in the radiation chamber of the fluidized bed reactor. In this manner, the hot "tongue" is prevented from extending as far as the beginning of the heat transfer surfaces in the reactor.

We claim:

1. A method for cooling hot process gases flowing through a radiation section of a waste heat boiler in which said flow of hot gases creates a hot tongue region within said radiation section utilizing a matter-injector comprising the steps of: (a) positioning the matter injector to expel matter into the hot tongue region; (b) expelling the matter form the matter injector into the hot tongue; and (c) cooling the hot tongue with the matter.

2. The method of claim 1, wherein step (b) is practiced by expelling pulverized process infeed material.

3. The method of claim 2, comprising the further step (d) of separating pulverized material from the hot process gases and wherein step (b) is practiced by expelling the separated pulverized material.

4. The method of claim 1, comprising the further step (d) of separating dust from said process gases, and wherein step (b) is practiced by expelling the dust.

5. The method of claim 1, comprising the further step (d) of cleaning and cooling the process gases, and wherein step (b) is practiced by expelling the cleaned and cooled process gases.

6. The method of claim 1, wherein step (b) is practiced by expelling gases that chemically react with the hot process gases.

7. The method for cooling hot process gases flowing through a radiation section of a waste heat boiler in which said flow of hot gases creates a hot tongue region within said radiation section utilizing a lance comprising the steps of: (a) positioning the lance to inject matter into the hot tongue region; (b) expelling the matter from the lance into the hot tongue; and (c) cooling the hot tongue with the injected matter.

8. The method of claim 7, wherein step (a) is practiced by placing the portion of the lance form which matter is expelled within said hot tongue region.

* * * * *